W. WHEELER.
PNEUMATIC TOOL.
APPLICATION FILED FEB. 23, 1907.
Reissued Apr. 20, 1909.
12,945.
2 SHEETS—SHEET 1.
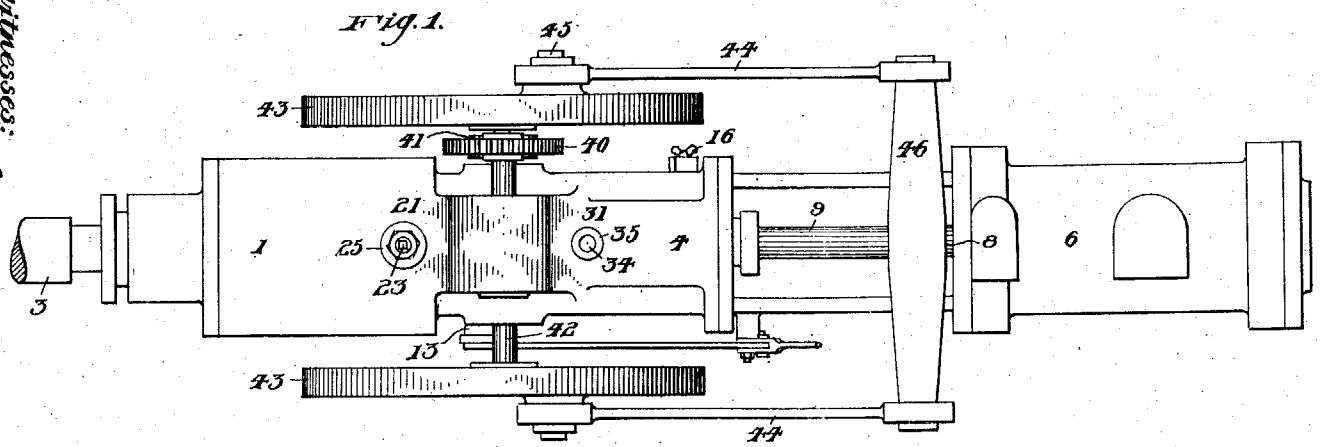
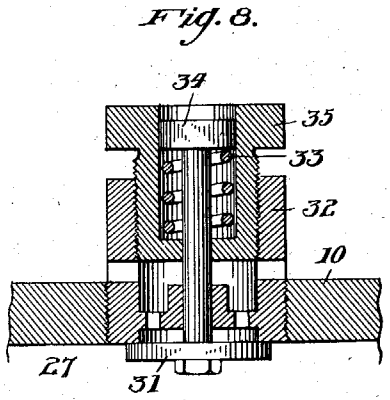
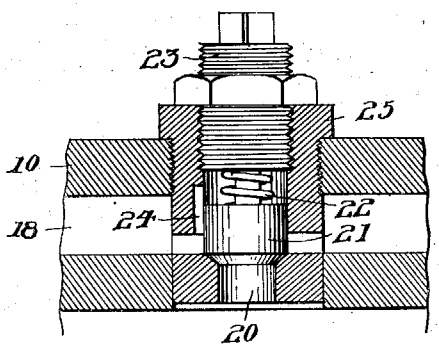
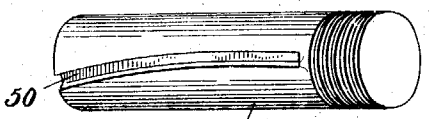
Witnesses:
J. R. Fyffleman,
Walter Richard.
Inventor
Walter Wheeler,
By J. E. Hobbs
Atty.

W. WHEELER.

PNEUMATIC TOOL.

APPLICATION FILED FEB. 23, 1907.

Reissued Apr. 20, 1909.

12,945.

2 SHEETS—SHEET 2.

Witnesses:

J. P. Hellman,

Albert Reakard.

Inventor

Wells Wheeler,

By J. W. Hassler

Atty

UNITED STATES PATENT OFFICE.

WELLS WHEELER, OF SWISSVALE, PENNSYLVANIA, ASSIGNOR OF ONE-HALF TO FRANK W. CHATTIN, OF BUTLER, PENNSYLVANIA.

PNEUMATIC TOOL.

No. 12,945. Specification of Reissued Letters Patent. Reissued April 20, 1909.

Original No. 835,589, dated November 13, 1906, Serial No. 337,277. Application for reissue filed February 23, 1907. Serial No. 359,032.

*To all whom it may concern:*

Be it known that I, WELLS WHEELER, a resident of Swissvale, in the county of Allegheny and State of Pennsylvania, have invented a new and useful Improvement in Pneumatic Tools; and I do hereby declare the following to be a full, clear, and exact description thereof.

This invention relates to percussion implements, such as rock-drills and the like. Its object is to provide an implement of this character which is actuated pneumatically and in which the implement itself and the source of power are self-contained—that is, the implement, the compressor, and the compressor-motor all being mounted on the same base.

Further objects of the invention are to provide an implement of the character named in which the tool is automatically lifted or withdrawn after actuation by means of compressed air; to so construct the compressor as to secure a priming compression of the air; and to so control the air that it will not act upon the tool-piston at each reciprocation of the compressor piston, the latter being inactive during a predetermined number of reciprocations, so that a motor may be used which operates much faster than it is desired to actuate the tool, also that between active strokes the motor and compressor may recover their momentum and power.

For the attainment of the foregoing objects the invention consists of the arrangement of parts hereinafter described and claimed.

Figure 2:
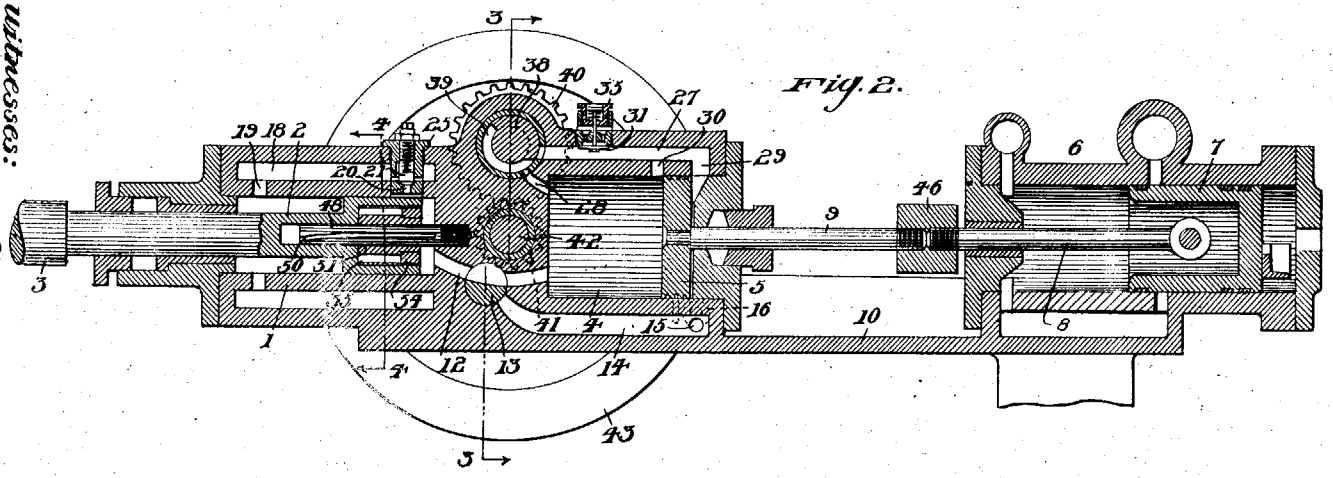
Figure 4:
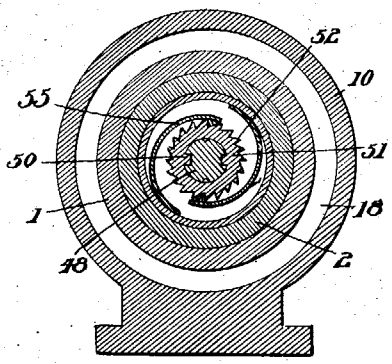
Figure 6:
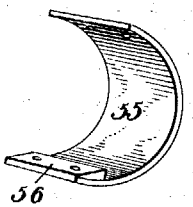
Figure 3:
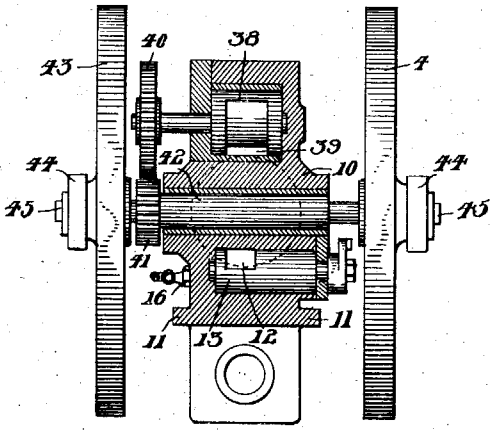

In the accompanying drawings, Figure 1 is a plan view of the device. Fig. 2 is a vertical longitudinal section through the same. Fig. 3 is a transverse section on the line 3—3 Fig. 2. Fig. 4 is a transverse section on line 4—4 Fig. 2. Figs. 5 and 6 are detail views of the tool-rotating means. Figs. 7 and 8 are enlarged sectional views of the check and inlet valves.

The invention comprises a suitable tool-actuating cylinder 1, in which is the tool-actuating piston 2, which at its outer end is provided with a socket or chuck 3 for receiving the drill or other tool, a compressor-cylinder 4, containing a compressing-piston 5, a motor 6, which may be of any suitable type, but which is shown as a standard two-cycle gasolene-engine, and its movable element—viz., the piston 7, connected by suitable rods 8 and 9 to the compressor-piston 5 for reciprocating the latter. All of these elements are mounted upon a common base or support, such as the casting 10, and, in fact, in the specific form illustrated the tool-actuating cylinder, the compressor-cylinder, the motor-cylinder, and the base member 10 are formed as a single integral casting; but obviously this can be varied without departing from the spirit of the invention. The base member 10 is provided with suitable means, such as the wings 11, for mounting on a tripod or other suitable support, as will be readily understood by those skilled in the art. Inasmuch as the motor may be of any suitable type, it has not been deemed necessary to illustrate it in detail.

The compressor-cylinder 4 and the tool-actuating cylinder 1 are connected by means of a port 12, which is controlled by a suitable valve 13, by means of which said port may be closed—as, for instance, when starting the implement in order to permit the gasolene-motor to attain the desired speed. When the port 12 is closed, the valve 13 connects the cylinder 4 with a passage 14, having an outlet 15 to the atmosphere. This outlet is controlled by a suitable cut-off valve or cock 16, so that when the motor is running and it is desired to stop the tool-actuating piston, as may be necessary when changing drills and the like, the outlet 15 may be throttled in order to oppose resistance to the reciprocation of the piston 5 in order to prevent the engine from racing.

The tool-actuating piston is driven forwardly by air entering behind said piston. It is retracted by means of compressed air contained in the chamber 18, which is connected to the forward end of the cylinder chamber 1 by means of a port 19. The chamber 18 is connected to the rear end of the cylinder chamber 1 by means of a port 20, which is controlled by a suitable reducing-valve, such as the check-valve 21, which is backed by means of a spring 22. The tension of said spring may be adjusted by means of a suitable screw 23. A port 24 leads from the chamber 18 to the outer face of the valve 21, so that the valve will be held to its seat not only by the spring 22, but by the air pressure contained in the chamber 18. For convenience of manufacture the valve, the spring 22, and the adjusting-screw 23 are all mounted in a movable plug 25, in which a valve-seat is formed.

Provision is made for imparting to tool-piston 2 a less number of strokes than are made by the motor and compressor-piston 5, as here embodied, the ratio being one to two. The speed of the motor may be too high for effective work by the tool at corresponding speed. Also, a smaller motor may be employed than would otherwise be necessary, as during the intervening inactive or idle strokes the motor gains momentum, or at least recovers that spent on the active strokes, thus maintaining an even and economized power. This operation is accomplished by providing a by-pass 27, which is connected to the outlet end of the cylinder 4 through a port 28 and to the inlet end of the cylinder by a port 29. A port 30 also connects this by-pass with the chamber of cylinder 4 in front of the piston 5 when the latter is in its rearmost position. The inlet valve is shown at 31, this being mounted in a suitable plug 32 and being arranged to open inwardly. It is normally held to its seat by means of a spring 33, arranged at one end to bear against a head 34 on the outer end of the valve-stem and against an adjustable plug 35. This valve opens by the suction produced by the travel of the piston 5, thus drawing air into the cylinder in a well-understood manner.

The by-pass 27 is controlled by suitable valve mechanism arranged to keep said by-pass open during a predetermined number of reciprocations of the piston 5, and is then closed so that on the next forward stroke of piston 5 the compressed air in front thereof will be forced into the cylinder 1 to actuate piston 2. This valve mechanism may be of various forms. It is shown as a rotating plug-valve 38, having a suitable groove 39 for establishing communications between the port 28 and by-pass 27 when said valve is in a certain position. This plug-valve will be rotated from any suitable moving part of the mechanism. As shown in the drawings it is provided with a gear 40, which meshes with a similar gear 41, on a shaft 42. The latter extends through suitable bearings in the casting 10, and preferably will be provided with a fly wheel or wheels 43 for steadying the movement thereof. The shaft 42 is rotated by means of connecting-rods 44, connected at one end to wrist pins 45 on the fly-wheels 43 and at their opposite ends being connected to a cross-head 46, secured to the rods 8 and 9. For convenience of assembling the rods 8 and 9 are threaded into the cross-head. It will be obvious that the reciprocation of the cross-head 46 will impart rotation to shaft 42, and this movement by means of the gears 40 and 41 will impart rotary movement to the valve 38.

The gears 40 and 41 will be of such relative sizes as to rotate the valve at the desired speed to maintain the by-pass 27 open during the desired number of reciprocations of the piston 5 and will then close said by-pass. The gears shown in the drawings have a ratio of one to two, so that the valve 38 will be given a complete rotation during each two reciprocations of the pistons 5. Consequently upon one reciprocation of piston 5 the by-pass 37 will be open and on the next reciprocation it will be closed. This will secure one blow of the actuating piston 2 for each two reciprocations of the piston 5. Obviously, however, by changing the ratio of the gears 40 and 41, and correspondingly modifying the length of the groove 39 in the valve 38, it will be possible to secure a blow of the piston 2 for each third, fourth, fifth, or other number of reciprocations of the piston 5.

In rock-drilling, &c., it is necessary, or at least desirable, to rotate the tool. This I accomplish as follows: The piston 2 is made hollow, and projecting into the same is a stud or rod 48, provided with a spiral groove or spline 50, this stud being fixedly secured to the main casting by threading the same therein, as shown. Surrounding this stud or rod is a sleeve 51, provided with a spline or groove to engage the spiral groove or spline on the stud, and on its outer face being provided with ratchet-teeth 52. This sleeve is connected to the piston 2, so that it must reciprocate therewith, such as by a bushing 54, threaded in the outer end of the piston behind the sleeve 51. A spring-pawl or detent 55 has one end fixed to the piston 2 and its opposite end provided with a tooth 56, arranged to engage the teeth on the sleeve 51. When the piston is driven forward, the sleeve 51 will be rotated by means of the spiral groove or spline 50, the pawl during the forward movement sliding idly over the ratchet-teeth 52. On the return movement, sleeve 51 will be rotated in the opposite direction, and as the tooth 56 of the pawl will be in engagement with a ratchet-tooth on said sleeve, the rotation of the sleeve will act to rotate piston 2 and with the latter the tool carried thereby.

The operation of the implement shown is as follows: If a gasolene-motor is used, the valve 13 will be turned by hand, so as to cut off the port of the tool-actuating cylinder and open the cylinder 4 to the port 14, thus preventing the air from offering resistance to the piston 5. This position of the valve 13 will be maintained until the motor has acquired its necessary speed, when the valve 13 will be turned to open communication between the cylinders 4 and 1. When the piston 5 moves forwardly and the valve 38 closes the by-pass, the suction generated will open the inlet-valve 31, thus drawing air into the rear end of the cylinder. During the backward movement of the piston this air will be compressed in the by-pass 27 and will escape through the port 30 into the forward end of the cylinder. On the next forward stroke of the piston 5 the valve 38 will have opened the by-pass and the air in front of the piston 5 passes through the by-pass 27 to the rear end of the cylinder and will not be forced into the cylinder 1 with sufficient tension to move the tool-actuating piston 2. The air compressed by the first backward stroke of piston 5 will continue to pass around said piston, from one side thereof to the other, as long as valve 38 remains open. As soon, however, as the valve 38 has been rotated to again close said by-pass, piston 5 on its next forward reciprocation will force the compressed air in front of it through port 12 into cylinder 1, thus moving the tool-actuating piston 2 with sufficient force to produce an efficient blow.

On the first admission of air to the cylinder 1 and as soon as the piston 2 has uncovered the port 20 the valve 21 will be raised, permitting air to flow into the chamber 18. The valve 21 will remain open until the pressure in the chamber 18 plus the tension of the spring 22 overbalances the pressure in the cylinder 1, when said valve will be closed. On future admissions of air to the cylinder 1 the valve 21 will be raised only in case the pressure in the chamber 18 plus the tension of the spring 22 is less than the pressure in the cylinder 1. Consequently the valve 21 acts as a regulating check-valve to control the pressure in the chamber 18 and to prevent the air from being drawn out of said chamber when the piston 5 moves backwardly.

After a forward movement of the tool-actuating piston 2 in the manner just described and as soon as the piston 5 begins to move backwardly it will create a suction in the cylinder 1, or at least will greatly reduce the pressure in said cylinder. Consequently the air in the chamber 18 will pass through the port 19 and act on the forward face of the piston 2, thus positively retracting the latter. Air under predetermined pressure is thus permanently maintained in chamber 18, and operates as a pneumatic cushion or spring for retracting piston 2 and the tool. During the reciprocations of the piston 2, said piston and the tool carried thereby will be rotated on each return stroke of the piston by the means hereinbefore described.

It is characteristic of the tool that while it is in operation no air is exhausted excepting such as escapes around the piston rods, so that when the working pressures, determined by the tension of springs 33 and 22, are once obtained, they continue without appreciable loss, and practically no power is consumed on air at atmospheric pressure.

When the apparatus is operating under normal working conditions the density or pressure of the air is above that of the atmosphere, and is equal in cylinder 4 and by-pass 27 when the piston 5 is at its limit of rearward movement, see Fig. 2, this being so as well when valve 38 is closed as when open. When piston 5 starts on its active or compressing stroke, port 30 is immediately closed and the confined body of compressed air between pistons 2 and 5 is driven forwardly and its density is increased to actuate piston 2 on its percussion stroke, and the compressed air behind the piston and in by-pass 27 correspondingly expands. Conversely, on the backward stroke of piston 5, the air in front thereof expands, and the air in the rear is compressed, so that by the time port 30 is open to the front of the piston the normally equal working pressures are again established at the opposite faces of the piston and there is no appreciable flow of air in either direction through said port. If through leakage in the system the pressure should fall below the desired operating density, determined by adjustable spring valve 31, sufficient air will be drawn in through the latter on a forward stroke of the piston to supply the deficiency, the pressures in front of and behind the piston equalizing through port 30 when the piston is in rearward position. The air in the tool end of the tool cylinder is under initial tension due to the compressor. Its tension is further increased by the movement of the piston under the influence of the compressor and is still further increased by the compression which it receives in checking the momentum of the tool piston and tool.

When it is desired to change tools, it is not necessary to stop the motor 6. The valve 13 will be turned to cut off the communication between the pressure and tool-actuating cylinders and will connect the compressing-cylinder with the port 14 and through the same to the air. The valve 16 will be partially closed during this operation in order to throttle the port 15 and offer sufficient resistance to the piston 5 to prevent the engine from racing.

The implement described is entirely self-contained. It has all the advantages of a pneumatically-operated tool and does away with the necessity of a separate power-plant and the extensive pipings which are necessary with pneumatic tools as at present constructed and operated. At the same time, the air is given sufficient preliminary compression to give an effective blow to the tool.

What I claim is:—

1. In a percussion implement, the combination of a tool-actuating cylinder, a piston therein, a compressing-cylinder and piston therein, connections between said cylinders, a by-pass connecting the ends of the compressing-cylinder, and valve mechanism arranged to keep said by-pass open during a predetermined number of reciprocations of the compressing-piston and close the same during the next reciprocation of said piston.

2. In a percussion implement, the combination of a tool-actuating cylinder, a piston therein, a compressing-cylinder, a piston therein, connections between said cylinders, a by-pass connecting the ends of the compressing-cylinder, a movable valve controlling said by-pass, and means for moving said valve so arranged as to hold the by-pass open for a predetermined number of reciprocations of the compressor-piston and to then close the same during a forward stroke of the compressor-piston.

3. In a percussion implement, the combination of a tool-actuating cylinder, a piston therein, a compressing-cylinder, a piston therein, connections between said cylinders, a by-pass between the ends of said compressing-cylinder, a rotary valve controlling said by-pass, and gearing actuated from the compressor-actuating means and arranged to rotate the valve at such speed as to hold the by-pass open during a predetermined number of reciprocations of the compressor-piston and to then close the same.

4. In a percussion implement, the combination of a tool-actuating cylinder, a piston therein, an air-compressing cylinder, connections between said cylinders, a motor connected to the compressor, a base common to said cylinders and motor, and valve mechanism arranged to secure the actuation of the tool piston only at predetermined reciprocations of the compressor-piston.

5. In a percussion implement, the combination of a tool-actuating cylinder having an inlet-port into its rear end, a piston therein, a chamber connected by ports to the forward end and to the rear end of said tool-actuating cylinder, and a spring-actuated regulating check-valve seating toward the actuating-cylinder and controlling the inlet-port to said chamber.

6. In a percussion implement, the combination of a tool-actuating cylinder having an inlet-port into its rear end, a piston therein, a chamber having a port connecting to the forward end of the tool-actuating cylinder and also having an inlet-port, a check-valve seating toward the actuating-cylinder and controlling the inlet-port, a spring arranged to hold the check-valve to its seat, and connections for admitting pressure from said chamber to the outer end of said valve to assist the spring in holding the valve to its seat.

7. In a percussion implement, the combination of a tool-actuating cylinder having an air inlet at its rear end, a piston therein, said cylinder having an air passage extending from the rear end to the front end thereof, and a spring-held valve seating toward the rear end of the cylinder and normally closing said air passage and controlling the flow of air therethrough to the forward end of the cylinder.

8. A percussion implement having a tool-actuating cylinder provided with a compressed air-inlet at its rear end, a piston, and means operative during a forward stroke of the piston for passing compressed air from the rear end of the cylinder to its forward end.

9. A percussion implement having a tool-actuating cylinder provided with a compressed air-inlet at its rear end, a piston, said cylinder having an air passage extending from the rear end thereof to its front end, and means actuated by air pressure from the rear end of the cylinder for causing compressed air to enter the forward end of the cylinder when the piston is on its forward stroke.

10. In a percussion implement, alined motor, compressing, and tool cylinders with the compressing cylinder intermediate the motor and tool cylinders, and a base common to and rigidly connecting the three alined cylinders.

11. In a percussion implement, alined motor, compressing, and tool cylinders, and a rigid connection between the three alined cylinders.

12. In a percussion implement, the combination of a tool cylinder, a motor cylinder, and a compressing cylinder intermediate the tool and motor cylinders and rigidly connected thereto.

13. In a percussion implement, the combination of a cylinder structure comprising a tool cylinder and a compressing cylinder, a motor cylinder rigidly connected to said cylinder structure, operatively connected pistons in the cylinders, and fly wheels journaled to said cylinder structure and operatively connected to the motor piston.

14. In a percussion implement, the combination of a cylinder structure having operatively connected compressing and tool-cylinders, pistons for the cylinders, a motor cylinder and piston, said cylinder being rigidly connected to the cylinder structure with its piston connected to the piston of the compressing cylinder, and a fly-wheel journaled to the cylinder structure and connected to the motor.

15. In a percussion implement, the combination of a cylinder structure having operatively connected compressing and tool cylinders, pistons for the cylinders, a motor cylinder and piston, said cylinder being rigidly connected to the cylinder structure with its piston connected to the piston of the compressing-cylinder, and fly-wheels journaled on the cylinder structure at opposite sides thereof and connected to the motor piston.

16. In a percussion implement, the combination of a cylinder structure having a compressing-cylinder in one end and a tool-cylinder in the opposite end and communicating with the compressing cylinder, a shaft extending through said structure between the cylinders, fly-wheels on the ends of the shaft, pistons for the cylinders, a motor cylinder and piston, said cylinder being rigidly connected to the cylinder structure with its piston connected to the piston of the compressing-cylinder, and a cross-head connected to the motor-piston and to the fly-wheels.

17. In a device of the character described, the combination of a percussion cylinder and piston, means for supplying air to the tool end of the percussion cylinder, means for trapping the air at the tool end of the percussion cylinder during the major portion of the return stroke of the tool, means for supplying air to the opposite end of the tool cylinder and effecting the working stroke of the piston, and means for varying the effective pressure of said latter air to limits above and below the normal pressure of the trapped air.

18. In a device of the character described, the combination of a percussion cylinder and piston, said parts having a passage for supplying air to the tool end of the percussion cylinder, a yielding valve in said passage and opening toward the tool end of the percussion cylinder, means for supplying air to the opposite end of the tool cylinder for effecting the working stroke of the piston, and means for varying the effective pressure of said latter air to limits above and below the normal pressure of the trapped air.

19. In a device of the character described, the combination of a percussion cylinder and piston, means for supplying air to the tool end of the percussion cylinder, means for preventing the outflow of said air from said cylinder during the major portion both of the working and return strokes of the tool, means for supplying air to the opposite end of the tool cylinder for effecting the working stroke of the piston, and means for varying the effective pressure of said air to limits above and below the normal pressure of the trapped air.

20. In a rock drill, the combination of a compressor cylinder and piston, a tool cylinder and piston, a piston rod extending from one side of said tool piston and adapted to have a tool connected thereto, means for supplying air to the end of said tool cylinder through which said rod passes, means for trapping the air at the tool end of the tool cylinder during the major portion of the return stroke of the tool, means for supplying air to the opposite end of the tool cylinder for effecting the working stroke of the piston, and means for varying the effective pressure of said latter air to limits above and below the normal pressure of the trapped air.

In testimony whereof I affix my signature in the presence of two witnesses.

WELLS WHEELER.

Witnesses:
WILLIAM K. WEAVER,
WM. A. KNORR.